(12) United States Patent
Huang et al.

(10) Patent No.: US 11,704,268 B2
(45) Date of Patent: Jul. 18, 2023

(54) USB 2.0 PHOTOELECTRIC TRANSMISSION SYSTEM

(71) Applicant: SHENZHEN AFALIGHT CO., LTD., Guangdong (CN)

(72) Inventors: Junbin Huang, Guangdong (CN); Quanfei Fu, Guangdong (CN); Yong Yang, Guangdong (CN); Jihui Chen, Guangdong (CN); Ling Long, Guangdong (CN)

(73) Assignee: SHENZHEN AFALIGHT CO., LTD., Shenzhen (CN)

( * ) Notice: Subject to any disclaimer, the term of this patent is extended or adjusted under 35 U.S.C. 154(b) by 79 days.

(21) Appl. No.: 17/549,841

(22) Filed: Dec. 13, 2021

(65) Prior Publication Data

US 2022/0237135 A1 Jul. 28, 2022

Related U.S. Application Data

(63) Continuation of application No. PCT/CN2021/073775, filed on Jan. 26, 2021.

(51) Int. Cl.
*G06F 13/42* (2006.01)
*G06F 13/38* (2006.01)
*G02B 6/42* (2006.01)

(52) U.S. Cl.
CPC ......... *G06F 13/382* (2013.01); *G02B 6/4274* (2013.01); *G06F 13/4282* (2013.01); *G06F 2213/0042* (2013.01)

(58) Field of Classification Search
CPC ............... G06F 13/382; G06F 13/4282; G06F 2213/0042; G02B 6/4274
See application file for complete search history.

(56) References Cited

U.S. PATENT DOCUMENTS

| 8,678,673 | B2 * | 3/2014 | Lin | ................... | G06K 19/07732 |
| | | | | | 398/43 |
| 2008/0235418 | A1 * | 9/2008 | Werthen | ............... | H04B 10/807 |
| | | | | | 710/106 |
| 2009/0216922 | A1 * | 8/2009 | Park | ...................... | G06F 13/385 |
| | | | | | 710/63 |
| 2010/0150572 | A1 * | 6/2010 | Lee | ........................ | G06F 13/409 |
| | | | | | 398/141 |
| 2011/0246681 | A1 * | 10/2011 | Lai | ...................... | G06F 13/4081 |
| | | | | | 710/63 |

\* cited by examiner

*Primary Examiner* — Henry Tsai
*Assistant Examiner* — Harry Z Wang

(57) ABSTRACT

The present disclosure relates to a USB 2.0 photoelectric transmission system, which includes a first USB 2.0 connector, a second USB 2.0 connector, a first signal directional interpreting circuit, a second signal directional interpreting circuit, a first laser, a second laser, a first photodetector and a second photodetector, wherein a first end and a second end of the first signal directional interpreting circuit are respectively connected with a D+ pin and a D− pin of the first USB 2.0 connector; a third end and a fourth end of the first signal directional interpreting circuit are respectively connected with the first laser and the second photodetector.

6 Claims, 1 Drawing Sheet

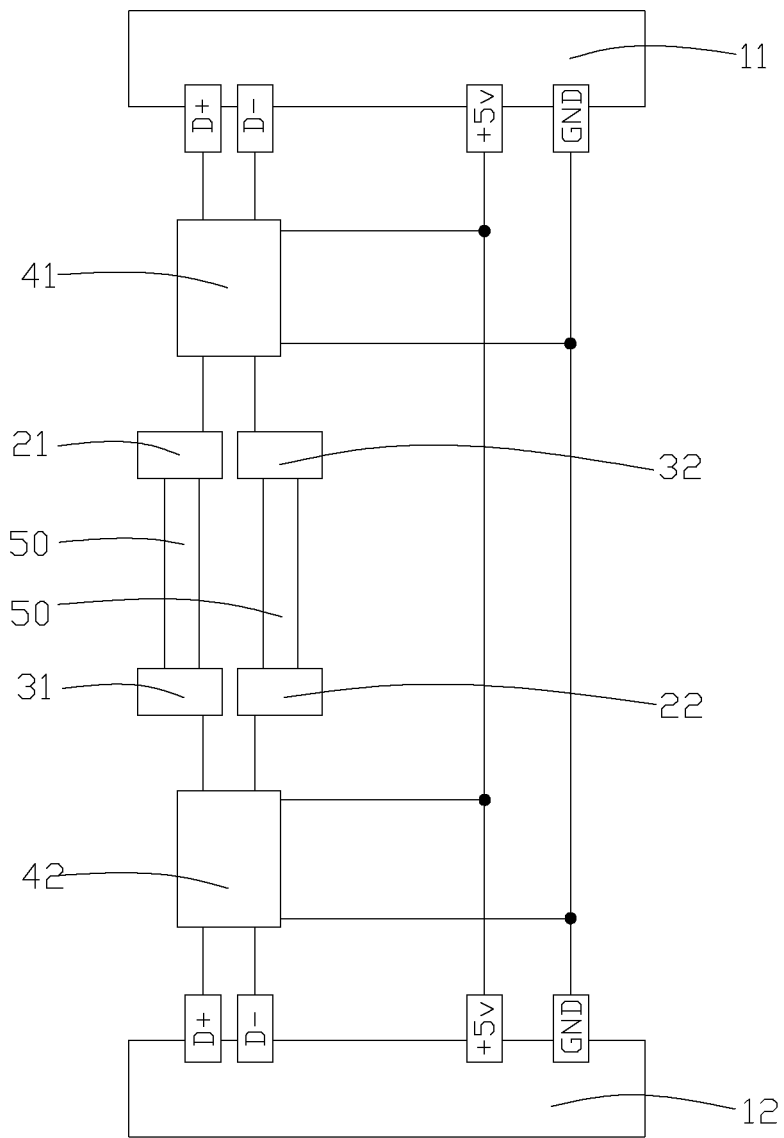

USB 2.0 PHOTOELECTRIC TRANSMISSION SYSTEM

CROSS REFERENCE TO RELATED APPLICATIONS

The present application is a Continuation Application of PCT Application No. PCT/CN2021/073775 filed on Jan. 26, 2021, the contents of which are incorporated herein by reference in their entirety.

TECHNICAL FIELD

The present application belongs to the technical field of photoelectric transmission, in particular to a USB 2.0 photoelectric transmission system.

BACKGROUND

Duplex, a term for communication transmission, means that this channel allows transmission in two directions in communication, while simplex means only allowing party A to send information to party B, but Party B cannot send information to Party A. If transmission in both directions is allowed at the same time, it is called full duplex; the so-called half-duplex means that only one action occurs in a period of time. For a simple example, only one car can pass through a narrow road at a certain time, and when there are two cars facing each other at present, only one car is allowed to pass first, and then the other passes after the first cars drives away. This example vividly illustrates the principle of half-duplex, and USB 2.0 is precisely a half-duplex protocol.

Due to the different structures between a transmitting component and a receiving component for photoelectric conversion, that is, one is a laser and the other is a photodetector, accordingly, it is necessary to clearly define whether the circuit channel connecting the laser or the photodetector is the transmitting terminal or the receiving terminal, so it is impossible to realize real USB 2.0 photoelectric transmission. In the related art, USB 2.0 electric signals are packaged and uploaded to USB 3.0 signals by a chip, and because in the USB protocol, USB 3.0 is connected to a laser and a photodetector in a simplex manner, USB 3.0 can indirectly realize the photoelectric transmission of USB 2.0 by photoelectric transmission. However, there are many defects in the above solutions. First, since it is not a truly simple USB 2.0 transmission, it cannot be used in many applications; for example, if two devices are USB 2.0 devices, they cannot be used at all because they do not have any USB 3.0 PIN. Second, in this method, the modules have to be divided (a HOST end and a Device end) in different directions, which is not real USB 2.0 signal transmission with free exchange and interfix.

SUMMARY

The present application provides a USB 2.0 photoelectric transmission system, which can in real sense realize the USB 2.0 photoelectric transmission with free exchanging and interfix irrespective of directions.

The present application provides a USB 2.0 photoelectric transmission system, which comprises a first USB 2.0 connector, a second USB 2.0 connector, a first signal directional interpreting circuit, a second signal directional interpreting circuit, a first laser, a second laser, a first photodetector and a second photodetector, wherein a first end and a second end of the first signal directional interpreting circuit are respectively connected with a D+ pin and a D− pin of the first USB 2.0 connector; a third end and a fourth end of the first signal directional interpreting circuit are respectively connected with the first laser and the second photodetector, a first end and a second end of the second signal directional interpreting circuit are respectively connected with a D+ pin and a D− pin of the second USB 2.0 connector, and a third end and a fourth end of the second signal directional interpreting circuit are respectively connected with the second laser and the first photodetector; the first laser and the first photodetector, and the second laser and the second photodetector are connected by optical fibers, the first signal directional interpreting circuit and the second signal directional interpreting circuit are configured for connecting the first laser with the D+ pin or D− pin of the first USB 2.0 connector or connecting the second laser with the D+ pin or D− pin of the second USB 2.0 connector when it is recognized that there is an electric signal flowing into the D+ pin or D− pin, and for connecting the first photodetector with the D+ pin or D− pin of the second USB 2.0 connector or connecting the second photodetector with the D+ pin or D− pin of the first USB 2.0 connector when it is recognized that there is an electric signal flowing into the first photodetector or the second photodetector.

Furthermore, the first signal directional interpreting circuit and the second signal directional interpreting circuit are both electrically connected with power terminals of the first USB 2.0 connector and the second USB 2.0 connector, and the first signal directional interpreting circuit and the second signal directional interpreting circuit are both electrically connected with ground terminals of the first USB 2.0 connector and the second USB 2.0 connector.

Furthermore, the first signal directional interpreting circuit is further configured to close a circuit channel between the second photodetector and the D+ pin or D− pin of the first USB 2.0 connector when it is recognized that there is an electric signal flowing into the D+ pin or D− pin of the first USB 2.0 connector; the second signal directional interpreting circuit is further configured to close a circuit channel between the first photodetector and the D+ pin or D− pin of the second USB 2.0 connector when it is recognized that there is an electric signal flowing into the D+ pin or D− pin of the second USB 2.0 connector; the first signal directional interpreting circuit is further configured to close a circuit channel between the first laser and the D+ pin or D− pin of the first USB 2.0 connector when it is recognized that there is an electric signal flowing into the second photodetector, and the second signal directional interpreting circuit is further configured to close a circuit channel between the second laser and the D+ pin or D− pin of the second USB 2.0 connector when it is recognized that there is an electric signal flowing into the first photodetector.

Furthermore, the first signal directional interpreting circuit and the second signal directional interpreting circuit each comprises FPGA chips.

Furthermore, the first signal directional interpreting circuit and the second signal directional interpreting circuit each comprises MCU microcontrollers.

Further, the first signal directional interpreting circuit and the second signal directional interpreting circuit are integrated chips.

Compared with the prior art, the embodiment of the present application has the beneficial effects that the first signal directional interpreting circuit and the second signal directional interpreting circuit of the present application connect the first laser with the D+ pin or the D− pin of the first USB 2.0 connector or connect the second laser with the D+ pin or the D− pin of the second USB 2.0 connector when it is recognized that there is an electrical signal flowing into the D+ pin or D− pin, so that the electric signal is transmitted to the first laser or the second laser, thereby exciting the first laser or the second laser to do the conversion from electricity to light The first signal directional interpreting circuit and the second signal directional interpreting circuit can also connect the first photodetector with the D+ pin or D− pin of the second USB 2.0 connector or connect the second photodetector with the D+ pin or D− pin of the first USB 2.0 connector when it is recognized that there is an electrical signal flowing into the first photodetector or the second photodetector, so that the electric signal can be transmitted from the first photodetector or the second photodetector to the D+/D− terminal, thus completing the conversion from light to electricity, and thus realizing in real sense the USB 2.0 photoelectric transmission with free exchanging and interfix irrespective of directions.

BRIEF DESCRIPTION OF DRAWINGS

In order to more clearly explain the embodiments of the present application or the technical solutions in the prior art, the drawings that need to be used in the description of the embodiments or the prior art will be briefly introduced below. Obviously, the drawings in the following description are only some embodiments of the present application, and for those skilled in the art, other drawings can be obtained according to these drawings without paying any creative effort.

The sole FIGURE is a schematic circuit diagram of a USB 2.0 photoelectric transmission system provided by an embodiment of the present application.

REFERENCE NUMERALS

11. First USB 2.0 connector; 12. Second USB 2.0 connector; 21. First laser; 22. Second laser; 31. First photodetector; 32. Second photodetector; 41. First signal directional interpreting circuit; 42. Second signal directional interpreting circuit; 50. Optical fiber.

DETAILED DESCRIPTION OF EMBODIMENTS

In order to make the purpose, features and advantages of the present application to be more obvious and easier to understand, the technical solution in the embodiments of the present application will be clearly and completely described below with reference to the drawings in the embodiments of the present application. Obviously, the described embodiments are only part of the embodiments of the present application, not all of them. Based on the embodiments in the present application, all other embodiments obtained by those skilled in the art without creative work shall fall within the scope of the present application.

Referring to the sole FIGURE, a USB 2.0 photoelectric transmission system of the present application includes a first USB 2.0 connector 11, a second USB 2.0 connector 12, a first signal directional interpreting circuit 41, a second signal directional interpreting circuit 42, a first laser 21, a second laser 22, a first photodetector 31 and a second photodetector 32. The first and second ends of the first signal directional interpreting circuit 41 are respectively connected to the D+ pin and D− pin of the first USB 2.0 connector 11, the third and fourth ends of the first signal directional interpreting circuit 41 are respectively connected to the first laser 21 and the second photodetector 32. The first and second ends of the second signal directional interpreting circuit 42 are respectively connected to the D+ pin and D− pin of the second USB 2.0 connector 12. The third end and the fourth end of the second signal directional interpreting circuit 42 are respectively connected with the second laser 22 and the first photodetector 31. The first laser 21 and the first photodetector 31, and the second laser 22 and the second photodetector 32 are connected by optical fibers 50. The first signal directional interpreting circuit 41 and the second signal directional interpreting circuit 42 are configured to connect the first laser 21 with the D+ pin or the D− pin of the first USB 2.0 connector 11 or the second laser 22 with the D+ pin or the D− pin of the second USB 2.0 connector 12 when it is recognized that there is an electric signal flowing into the D+ pin or the D− pin, and for connecting the first photodetector 31 with the D+ pin or D− pin of the second USB 2.0 connector 12 or connecting the second photodetector 32 with the D+ pin or D− pin of the first USB 2.0 connector 11 when it is recognized that there is an electric signal flowing into the first photodetector 31 or the second photodetector 32.

Compared with the related art, the first signal directional interpreting circuit 41 and the second signal directional interpreting circuit 42 of the present application connect the first laser 21 with the D+ pin or the D− pin of the first USB 2.0 connector 11 or connect the D+ pin or the D− pin of the second laser 22 with the second USB 2.0 connector 12 when it is recognized that there is an electrical signal flowing into the D+pin or D−pin, so that the electric signal is transmitted to the first laser 21 or the second laser 22, thereby exciting. The first signal directional interpreting circuit 41 and the second signal directional interpreting circuit 42 can also connect the first photodetector 31 with the D+ pin or D− pin of the second USB 2.0 connector 12 or the second photodetector 32 with the D+ pin or D− pin of the first USB 2.0 connector 11 when it is recognized that there is an electrical signal flowing into the first photodetector 31 or the second photodetector 32, so that the electric signal is transmitted from the first photodetector 31 or the second photodetector 32 to the D+/D− terminal, so as to complete the conversion from light to electricity, thus realizing in real sense the USB 2.0 photoelectric transmission with free exchanging and interfix irrespective of directions.

In the above embodiment, both the first signal directional interpreting circuit 41 and the second signal directional interpreting circuit 42 are electrically connected to the power terminals of the first USB 2.0 connector 11 and the second USB 2.0 connector 12, and both the first signal directional interpreting circuit 41 and the second signal directional interpreting circuit 42 are electrically connected to the ground terminals of the first USB 2.0 connector 11 and the second USB 2.0 connector 12.

Preferably, in order to prevent signal superposition crosstalk, the first signal directional interpreting circuit 41 is further used to close the circuit channel between the second photodetector 32 and the D+ pin or D− pin of the first USB 2.0 connector 11 when it is recognized that there is an electric signal flowing into the D+ pin or D− pin of the first USB 2.0 connector 11. The second signal directional interpreting circuit 42 is further used to close the circuit channel between the first photodetector 31 and the D+ pin or D− pin of the second USB 2.0 connector 12 when it is recognized that there is an electric signal flowing into the D+ pin or D− pin of the second USB 2.0 connector 12. The first signal directional interpreting circuit 41 is further used to close the circuit channel between the first laser 21 and the D+ pin or D− pin of the first USB 2.0 connector 11 when it is recognized that there is an electric signal flowing into the second photodetector 32, and the second signal directional interpreting circuit 42 is further used to close the circuit channel between the second laser 22 and the D+ pin or D− pin of the second USB 2.0 connector 12 when it is recognized that there is an electric signal flowing into the first photodetector 31.

Optionally, the first signal directional interpreting circuit 41 and the second signal directional interpreting circuit 42 in this embodiment comprise FPGA chips. In other possible embodiments, the first signal directional interpreting circuit 41 and the second signal directional interpreting circuit 42 comprise MCU microcontrollers, and the first signal directional interpreting circuit 41 and the second signal directional interpreting circuit 42 can also be integrated chips, which is not limited in this embodiment.

To sum up, the first signal directional interpreting circuit 41 and the second signal directional interpreting circuit 42 of the present application connect the first laser 21 with the D+ pin or D− pin of the first USB 2.0 connector 11 or connect the D+ pin or D− pin of the second laser 22 and the second USB 2.0 connector 12 when it is recognized that there is an electric signal flowing into the D+ pin or D− pin, so that the electric signal can be transmitted to the first laser 21 or the second laser 22, thereby exciting the first laser 21. The first signal directional interpreting circuit 41 and the second signal directional interpreting circuit 42 can also connect the first photodetector 31 with D+ pin or D− pin of the second USB 2.0 connector 12 or the second photodetector 32 with the D+ pin or D− pin of the first USB 2.0 connector 11 when it is recognized that there is an electric signal flowing into the first photodetector 31 or the second photodetector 32, so that the electric signal is transmitted from the first photodetector 31 or the second photodetector 32 to the D+/D− terminal, so as to complete the conversion from light to electricity, thus in real sense realizing the USB 2.0 photoelectric transmission with free exchanging and interfix irrespective of directions.

What is described above is the technical solution provided by the present application. For those skilled in the field, according to the concept of the embodiment of the present application, modifications may be made in the specific implementations and application scopes. To sum up, the content of this specification should not be construed as a limitation of the present application.

What is claimed is:

1. A USB 2.0 photoelectric transmission system comprising: a first USB 2.0 connector, a second USB 2.0 connector, a first signal directional interpreting circuit, a second signal directional interpreting circuit, a first laser, a second laser, a first photodetector and a second photodetector, wherein first and second ends of the first signal directional interpreting circuit are respectively connected to D+ pin and D− pin of the first USB 2.0 connector, third and fourth ends of the first signal directional interpreting circuit are respectively connected to the first laser and the second photodetector, first and second ends of the second signal directional interpreting circuit are respectively connected to D+ pin and D− pin of the second USB 2.0 connector, a third end and a fourth end of the second signal directional interpreting circuit are respectively connected with the second laser and the first photodetector, the first laser and the first photodetector, and the second laser and the second photodetector are connected by optical fibers, the first signal directional interpreting circuit and the second signal directional interpreting circuit are configured to connect the first laser with the D+ pin or the D− pin of the first USB 2.0 connector or the second laser with the D+ pin or the D− pin of the second USB 2.0 connector when it is recognized that there is an electric signal flowing into the D+ pin or the D− pin, and for connecting the first photodetector with the D+ pin or D− pin of the second USB 2.0 connector or connecting the second photodetector with the D+ pin or D− pin of the first USB 2.0 connector when it is recognized that there is an electric signal flowing into the first photodetector or the second photodetector.

2. The USB 2.0 photoelectric transmission system of claim 1, wherein the first signal directional interpreting circuit and the second signal directional interpreting circuit are both electrically connected with power terminals of the first USB 2.0 connector and the second USB 2.0 connector, and the first signal directional interpreting circuit and the second signal directional interpreting circuit are both electrically connected with ground terminals of the first USB 2.0 connector and the second USB 2.0 connector.

3. The USB 2.0 photoelectric transmission system of claim 1, wherein the first signal directional interpreting circuit is further configured to close a circuit channel between the second photodetector and the D+ pin or D− pin of the first USB 2.0 connector when it is recognized that there is an electric signal flowing into the D+ pin or D− pin of the first USB 2.0 connector; the second signal directional interpreting circuit is further configured to close a circuit channel between the first photodetector and the D+ pin or D− pin of the second USB 2.0 connector when it is recognized that there is an electric signal flowing into the D+ pin or D− pin of the second USB 2.0 connector; the first signal directional interpreting circuit is further configured to close a circuit channel between the first laser and the D+ pin or D− pin of the first USB 2.0 connector when it is recognized that there is an electric signal flowing into the second photodetector, and the second signal directional interpreting circuit is further configured to close a circuit channel between the second laser and the D+ pin or D− pin of the second USB 2.0 connector when it is recognized that there is an electric signal flowing into the first photodetector.

4. The USB 2.0 photoelectric transmission system of claim 1, wherein the first signal directional interpreting circuit and the second signal directional interpreting circuit each comprises FPGA chips.

5. The USB 2.0 photoelectric transmission system of claim 1, wherein the first signal directional interpreting circuit and the second signal directional interpreting circuit each comprises MCU microcontrollers.

6. The USB 2.0 photoelectric transmission system of claim 1, wherein the first signal directional interpreting circuit and the second signal directional interpreting circuit are integrated chips.

* * * * *